(12) United States Patent
Pain et al.

(10) Patent No.: US 8,164,663 B2
(45) Date of Patent: Apr. 24, 2012

(54) ANALOG BUS DRIVER AND MULTIPLEXER

(75) Inventors: Bedabrata Pain, Los Angeles, CA (US);
Bruce Hancock, Altadena, CA (US);
Thomas J. Cunningham, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 346 days.

(21) Appl. No.: 11/454,342

(22) Filed: Jun. 16, 2006

(65) Prior Publication Data

US 2007/0012870 A1  Jan. 18, 2007

Related U.S. Application Data

(60) Provisional application No. 60/691,529, filed on Jun. 17, 2005.

(51) Int. Cl.
*H04N 3/14* (2006.01)
*H04N 5/335* (2011.01)

(52) U.S. Cl. .................. 348/294; 348/308; 348/319

(58) Field of Classification Search .......... 348/294–310, 348/319; 250/208.1; 257/290–294
See application file for complete search history.

(56) References Cited

U.S. PATENT DOCUMENTS

| | | | | |
|---|---|---|---|---|
| 4,027,321 A * | 5/1977 | Collins et al. | ................. | 257/394 |
| 4,583,111 A * | 4/1986 | Early | ........................... | 257/207 |
| 4,853,111 A * | 8/1989 | MacArthur et al. | .......... | 208/421 |
| 5,471,515 A * | 11/1995 | Fossum et al. | ................. | 377/60 |
| 5,793,322 A | 8/1998 | Fossum et al. | ................ | 341/161 |
| 6,021,172 A | 2/2000 | Fossum et al. | ................... | 377/60 |
| 6,124,819 A | 9/2000 | Zhou et al. | ..................... | 341/155 |
| 6,222,175 B1 * | 4/2001 | Krymski | ..................... | 250/208.1 |
| 6,366,172 B1 * | 4/2002 | Hayashi et al. | ................. | 330/311 |
| 6,512,543 B1 * | 1/2003 | Kuroda et al. | ................ | 348/302 |
| 6,606,122 B1 * | 8/2003 | Shaw et al. | ..................... | 348/302 |
| 6,665,013 B1 * | 12/2003 | Fossum et al. | ................ | 348/308 |
| 6,714,243 B1 * | 3/2004 | Mathur et al. | ................ | 348/273 |
| 6,838,301 B2 | 1/2005 | Zheng et al. | ..................... | 438/48 |
| 6,839,452 B1 | 1/2005 | Yang et al. | ..................... | 382/103 |
| 7,106,915 B2 * | 9/2006 | Dierickx | ....................... | 382/312 |
| 2002/0036300 A1 | 3/2002 | Pain et al. | ...................... | 257/184 |
| 2002/0121655 A1 | 9/2002 | Zheng et al. | .................. | 257/291 |
| 2003/0011829 A1 * | 1/2003 | Dierickx | ....................... | 358/513 |

(Continued)

OTHER PUBLICATIONS

Nixon, R.H., et al., "256x256 CMOS Active Pixel Sensor Camera-On-A-Chip", *IEEE Journal of Solid-State Circuits*, vol. 31, pp. 2046-2050, (Dec. 1996).

(Continued)

*Primary Examiner* — Nhan T Tran
*Assistant Examiner* — Tuan Le
(74) *Attorney, Agent, or Firm* — Steinfl & Bruno LLP

(57) ABSTRACT

For a source-follower signal chain, the ohmic drop in the selection switch causes unacceptable voltage offset, non-linearity, and reduced small signal gain. For an op amp signal chain, the required bias current and the output noise rises rapidly with increasing the array format due to a rapid increase in the effective capacitance caused by the Miller effect boosting up the contribution of the bus capacitance. A new switched source-follower signal chain circuit overcomes limitations of existing op-amp based or source follower based circuits used in column multiplexers and data readout. This will improve performance of CMOS imagers, and focal plane read-out integrated circuits for detectors of infrared or ultraviolet light.

28 Claims, 11 Drawing Sheets

U.S. PATENT DOCUMENTS

| | | | |
|---|---|---|---|
| 2003/0133625 A1 | 7/2003 | Pain et al. | 382/288 |
| 2003/0183850 A1 | 10/2003 | Pain et al. | 257/200 |
| 2004/0169740 A1 | 9/2004 | Pain et al. | 348/229.1 |
| 2004/0207731 A1 | 10/2004 | Bearman et al. | 348/207.99 |
| 2006/0023092 A1 | 2/2006 | Pain et al. | 348/246 |
| 2006/0076590 A1 | 4/2006 | Pain et al. | 257/294 |
| 2007/0012870 A1* | 1/2007 | Pain et al. | 250/214 R |

OTHER PUBLICATIONS

Nixon, R.H. Et al., "256/spl/times/256 CMOS active pixel sensor camera-on-a-chip" Solid State Circuits Conference, (Feb. 8-10, 1996).

* cited by examiner

ANALOG BUS DRIVER AND MULTIPLEXER

CROSS REFERENCE TO RELATED APPLICATION

This application claims the benefit of U.S. provisional patent application Ser. No. 60/691,529, filed Jun. 17, 2005 for a "Linear and High-Speed Signal Chain for Readout Integrated Circuits and CMOS Imagers" by Bedabrata Pain, Bruce Hancock, and Thomas J. Cunningham, the disclosure of which is incorporated herein by reference for all purposes permitted by law and regulation.

STATEMENT REGARDING FEDERALLY SPONSORED RESEARCH OR DEVELOPMENT

Subject matter disclosed in this specification was supported at least in part through the performance of work under a NASA contract, and is subject to the provisions of Public Law 96-517 (35 U.S.C. §202) in which the Contractor has elected to retain title.

FIELD

The present disclosure relates to image sensors. In particular, it relates to the architecture of circuits for readout integrated circuits and CMOS imagers and more particularly to analog bus drivers and multiplexers.

BACKGROUND

The schematic block diagram of an image sensor 1 is shown in FIG. 1. The image sensor 1 may be an integrated visible CMOS imager or a readout integrated circuit (ROIC) for infrared (IR) or ultraviolet (UV) detectors. The particular image sensor 1 shown in FIG. 1 is an integrated visible CMOS imager that comprises a two-dimensional (2-D) pixel array 10, one-dimensional array of column sample and hold circuits 20, and analog horizontal bus driver and multiplexer circuits 30. The row decoder and logic circuit arrays 40 and the column decoder and logic circuit arrays 50 access the pixels 12 in the pixel array 10 for reading. If the image sensor 1 is an ROIC, a two-dimensional pixel readout/multiplexer takes the place of a 2-D pixel array, because the sensing elements are usually on a separate chip from the electronics described here, but the rest of the circuits remain the same. The current disclosure relates primarily to the analog horizontal bus driver and multiplexer.

FIG. 2 shows the schematic for the CMOS imager/ROIC architecture with a source-follower per detector architecture. Individual pixels 12 of the 2-D pixel array consists of a photodiode 15 implemented with a reverse-biased p-n junction that is integrated on the same chip for a CMOS imager or hybridized to the ROIC; and a source follower is comprised of transistors $M_{in}$ 14 (SF input FET), $M_{sel}$ 16 (select FET), and $M_{rst}$ 18 (reset FET).

The image sensor 1 operates in a column-parallel fashion (i.e., a row at a time). To begin exposure, the pixels 12 in a given row are reset by momentarily pulsing the line RST 11 high. Following exposure, the pixels 12 are readout in a row-at-a-time fashion. For readout, a row is selected by momentarily pulsing the line SEL 13 high. The source follower output from each pixel belonging to the row is available over the column buses 17. The column-parallel outputs are sampled by an array of bottom-of-column capacitors ($C_S$) 21 by pulsing the line SHS 23 high. The pixels 12 are then reset by momentarily pulsing the line RST 11 high, and the resultant outputs are again sampled on another array of bottom-of-the-column capacitors ($C_R$) 25 by pulsing the line SHR 27 high. The difference of the sampled voltages in each column 17 is the signal from each pixel 12, and is proportional to the charge accumulation on each photodiode 15.

The sampled voltages in each column 17 (on the capacitors 21 ($C_S$) and 25 ($C_R$)) are scanned out by using an analog horizontal bus driver/multiplexer circuit. FIG. 3 shows a schematic of two analog bus driver/multiplexer circuits 31 and 33. The capacitors 21 ($C_S$) and 25 ($C_R$) in each column 17 are buffered by the analog horizontal bus driver circuits 31 and 33. The output of the analog horizontal bus driver circuits 31 and 33 in each column 17 drives the capacitance of the horizontal buses 35 and 37 which feed, respectively, output buffer amplifiers 38 and 39. The analog bus driver circuits 31 occur in pairs in order to differentially readout sampled voltages from bottom-of-column capacitors 21 ($C_S$) and 25 ($C_R$) in each column 17.

For a large format array, the analog horizontal bus driver and multiplexer circuit 30 drives a large capacitance, and needs to have excellent linearity, large signal swing, high speed of operation, and near-ideal gain.

Accordingly, the two-dimensional pixel array is readout as follows in a typical CMOS imager or a focal-plane readout integrated circuit (IC) 1. First, the outputs of a row of pixels 12 are sampled in parallel at the bottom of the column 17. The sampled values are then scanned out using electronic amplifiers 38 and 39. The speed of column scanning determines the readout rate. FIGS. 4 and 5 show the two most common column amplifier schemes for reading out the pixel values.

Source-Follower Signal Chain

FIG. 4 shows the schematic diagram of a conventional column source-follower signal chain. See R. H. Nixon, S. E. Kemeny, B. Pain, C. O. Staller, and E. R. Fossum, "256×256 CMOS active pixel sensor camera-on-a-chip," *IEEE Journal of Solid-State Circuits*, vol. 31, pp. 2046-2050, December 1996, the disclosure of which is incorporated by reference herein for all purposes allowed by law and regulation.

As shown in FIG. 4, the pixel values sampled at the bottom of the column 17 are stored on column capacitors 111 ($C_s$). The reference capacitors ($C_R$), their associated FETs, and a horizontal bus are omitted for the sake of simplifying the diagram and discussion. The sampled values are then scanned using a switched source-follower circuit 100 consisting of $M_{sf}$ as the input FET 105, $M_{sel}$ as the selection switch FET 110 controlled by a column-decoded digital signal, and $M_{ld}$ as the load FET 115. While $M_{sf}$ and $M_{sel}$ are present in each column cell buffering the sample-and-hold capacitor 21 ($C_s$), there is only one load FET 115 ($M_{ld}$), since only one column is activated at a time during the scanning in order to provide a signal to the horizontal bus 112.

The same structure is duplicated in order to readout the signal in a differential fashion using the sample and hold capacitors 25 ($C_R$) (not shown in FIG. 4 but shown in FIGS. 2 and 3). In that case, the bottom-of-the-column sample-and-hold capacitors 25 and 21 ($C_R$ and $C_S$) consist of a pixel reference level ($V_R$) and a signal level ($V_S$) corresponding to pixel potentials before and after photo-generated charges have been accumulated.

The output of a particular column n $V_{out}(n)$ depends on the voltage drops across the FETs 105 ($M_{sf}$) and 110 ($M_{sel}$). In turn, they depend on the bias current $I_{bias}$, and the width and length ratio (W/L) of the respective FETs. For a given bias current, $I_{bias}$, the output voltage for column of index n is given by:

$$V_{out}(n) \equiv V_{out} = V_{Cs} + V_{to} + \sqrt{\frac{2I_{bias}}{\beta_{sf}}} + \Delta V_{drop}(V_{Cs}); \quad [1]$$

$$\beta_{sf} = \mu \cdot C_{ox} \cdot \left[\frac{W}{L}\right]_{sf}$$

where the index is dropped for simplicity, $V_{Cs}$ is the sampled voltage on the capacitor $C_s$, $V_{to}$ is the threshold voltage of $M_{sf}$, W/L is the transistor width to length ratio, $\Delta V_{drop}$ is the voltage drop across the drain and source of the switch FET $M_{sel}$, $\beta_{sf}$ is the transconductance factor for $M_{sf}$, $\mu$ is the mobility of carriers in the channel, and $C_{ox}$ is the oxide capacitance per unit area. Since $I_{bias}$ flows through the select FET 110 ($M_{sel}$) as well, (assuming that FET 110 ($M_{sel}$) is biased in the linear region of FET operation), $\Delta V_{drop}$ can be computed from:

$$I_{bias} = \beta_{sel} \cdot \left[ (V_{out} - V_{tsel}) \cdot (V_{out} - V_s) - \frac{1}{2} \cdot (V_{out} - V_s)^2 \right] \quad [2]$$

where $V_s$ is the voltage at the source of FET 105 ($M_{sf}$) and is given by:

$$V_s = V_{Cs} + V_{to} + \sqrt{\frac{2I_{bias}}{\beta_{sf}}} = V_{out} - \Delta V_{drop}(V_{Cs}) \quad [3]$$

Assuming that the effective threshold voltage $V_{tsel}$ changes linearly with $V_{SB}$ the source-to-body voltage (as shown in Equation 4—clearly an approximation introduced to simplify analysis), Equation 2 can be solved to yield (with γ being the FET body coefficient):

$$V_{out} = \frac{1}{1-\gamma} \cdot \left[ V_{to} - \frac{\gamma V_s}{2} + \sqrt{V_{to}^2 + \left(1 - \frac{\gamma}{2}\right)^2 V_s^2 - (\gamma + 2) \cdot V_s \cdot V_{to} + \frac{2 \cdot (1-\gamma) \cdot I_{bias}}{\beta_{sel}}} \right] \quad [4]$$

$$V_{tsel} = V_{to} + \frac{\gamma V_{SB}}{2}$$

The response time is determined by the time required to charge the horizontal bus parasitic ($C_B$) and load capacitance ($C_L$), and depends on the bias current ($I_{bias}$) and the transconductance of the FET 105 ($M_{sf}$) and the channel resistance of the select FET 110 ($M_{sel}$). By adding the slewing and the settling time together (assuming single pole response), the dependence $I_{bias}$ on the column readout time ($\Delta t_{read}$) is given by:

$$I_{bias} = I_R + \frac{I_S}{2} \left[ 1 + \sqrt{1 + 4\frac{I_R}{I_S}} \right] \quad [5]$$

$$I_R = \frac{(C_L + C_B) \cdot \Delta V}{\zeta \cdot \Delta t_{read}}; \quad I_S = \frac{(C_L + C_B)^2 \cdot \chi}{2\beta_{eff} \cdot \Delta t_{read}^2};$$

$$C_B = N_{col} \cdot (W_{sel} \cdot C_{edge} + C_{par})$$

-continued $$\beta_{eff} = \beta_{sel} \left( \frac{\beta_{sf}}{\beta_{sf} + \beta_{sel}} \right)^2$$

where $C_L$ is the fixed load capacitance, and $C_B$ is the bus capacitance, with $C_{edge}$ being the parasitic capacitance along the edge of the select FET 110 ($M_{sel}$), and $C_{par}$ is the parasitic capacitance independent of the select FET 110 ($M_{sel}$), $N_{col}$ is the number of columns, ξ is the ratio of current between the output transient current and the bias current, $W_{sel}$ is the width of the select capacitor 110 ($M_{sel}$), and χ is the setting factor, that is, the ratio of the settling time to the time constant (~7 for 0.1% accuracy).

As shown in Equations 4 and 5, both output voltage and readout time are strong functions of the bias current, as well as the size of the column FETs 105 and 110 ($M_{sf}$ and $M_{sel}$). Equation 4 also shows that the transfer function is extremely non-linear, the non-linearity resulting from the ohmic voltage drop across the FET switch 110 ($M_{sel}$). This voltage drops also causes a drastic reduction in the signal swing. Finally, except in a handful of situations, for a given operating speed, an increase in the W/L ratio of the switch FET 110 ($M_{sel}$) produces undesirable results: increase in both the required bias current and non-linearity, and reduction in the output voltage swing.

OPAMP Signal Chain

FIG. 5 shows a representative schematic of an opamp signal chain 120. The sample-and-hold capacitors 121 and 125 ($C_s$ and $C_R$) are connected to the horizontal buses 135 and 137 through selection switches 128 ($M_{sel}$). Unlike the source-follower signal chain described above, the horizontal buses 135 and 137 are held at a virtual ground via opamp feedback from the operational amplifier 131, and no dc current flows through the selection switches 128. Once a particular set of column capacitors are selected, the charge in the capacitor is transferred to the corresponding feedback capacitor 136 ($C_f$) through the feedback action, producing an output:

$$V_{out} = V_{out}^+ - V_{out}^- = \frac{C_s}{C_f} \cdot \frac{C_x}{C_g} \cdot [V_R - V_S] \quad [6]$$

where $V_{out}^{+(-)}$ are the outputs from the two sides of the differential signal chain, and $V_R$ and $V_S$ are the sampled pixel outputs corresponding to the reset level and the signal level respectively as discussed above in connection with FIG. 2. A big advantage of the opamp signal chain is its ability to provide accurate voltage gain, as shown in Equation 6, the voltage gain being defined as two capacitor ratios that are easy to implement using standard Very Large Scale Integration (VLSI) layout techniques.

Since no dc current flows through the horizontal buses 135 and 137, the resistive drop issues are no longer of concern. However, the bus capacitance ($C_B$) significantly impacts the setting time through the Miller effect, causing a drastic increase in the opamp bias current with an increase $C_B$. The Miller effect refers to the multiplication of the capacitance between input and output of an amplifier by a factor of $(1-A_v)$, in which $A_v$ is the open-loop voltage gain of the operational amplifier. The capacitance will charge and discharge with a current multiplied by $(1-A_v)$.

Assuming that a single stage design is employed to implement the opamp, the dependence of the required bias current ($I_{bias}$) to the column readout time ($\Delta t_{read}$) is given by:

$$I_{bias} = 2 \cdot \left\{ I_R + \frac{I_S}{2} \left[ 1 + \sqrt{1 + 4\frac{I_R}{I_S}} \right] \right\} \quad [7]$$

$$I_R = \frac{(C_L + C_B) \cdot \Delta V}{\zeta \cdot \Delta t_{read}}; \quad I_S = \frac{C_x^2 \cdot \chi}{2\beta_{op} \cdot \Delta t_{read}^2};$$

$$C_B = N_{col} \cdot (W_{sel} \cdot C_{edge} + C_{par})$$

$$\beta_{op} = \mu C_{ox} \left(\frac{W}{L}\right)_{op};$$

$$C_x = \left[ C_L + \frac{C_f \cdot (C_B + C_s)}{C_f + C_B + C_s} \right] \cdot \left[ \frac{C_f + C_B + C_s}{C_f} \right] = C_y \cdot \frac{C_f + C_B + C_s}{C_f}$$

It can be seen from the above equation that the opamp signal chain does not suffer from any ohmic drop problems, but the bias current required for a given readout time increases rapidly with $C_B$ (the horizontal bus parasitic capacitance) due to the Miller effect (captured in the expression for $C_x$). Note that a two-stage design will have qualitatively similar response.

Design Problems

Both signal chain implementations face serious design problems: the opamp chain suffering from the Miller effect from the horizontal bus capacitance, and the source-follower from $M_{sel}$ sizing issues.

For the source-follower signal chain described in connection with FIG. 4, the problem is as follows. FIG. 6 shows that the transfer function of the column source-follower driving the horizontal bus has marked non-linearity. Reduction of non-linearity requires operation with reduced bias current and increased W/L ratio of the selection switch FET 110 ($M_{sel}$). However, even for W/L as large as 40/1, the transfer function continues to exhibit non-linearity at low input voltage levels.

Increasing the $M_{sel}$ size (thus increasing the W/L ratio) results in a number of undesirable effects. Increasing the width of $M_{sel}$ increases the bus capacitance, because of the increase in the source capacitance of $M_{sel}$ connected to the horizontal bus. For a fixed bias current, the readout rate and hence the frame rate falls rapidly, the rapid fall resulting from the fact that settling time is inversely proportional to the trans-conductance ($g_m$) of a FET ($M_{sf}$ in this case), and the transconductance is proportional to the square root of the product of $I_{bias}$ and W/L ratio, as shown in Equation 8.

$$g_m \propto \sqrt{I_{bias} \cdot \frac{W}{L}} \quad [8]$$

FIG. 7 shows the simulated results of the effect of W/L ratio of $M_{sel}$ on the frame rate and the output voltage swing of the source-follower. It shows that for small $M_{sel}$ widths ($W_{sel}$ in µm), the frame rate is high—reaching a maximum around $W_{sel}$~2 µm. As $W_{sel}$ is increased, the frame rate falls rapidly, due to (as explained above) an increase in the horizontal bus capacitance. On the other hand, the output voltage swing (and resultant non-linearity) shows an exactly opposite behavior: voltage swing is unacceptably small for small $W_{sel}$.

FIG. 8 demonstrates this contradictory behavior even more clearly—both voltage swing and gain reducing rapidly as the frame-rate is increased. The presence of the inverse relationship between frame rate and voltage swing (and gain) makes it very difficult to find a suitable operating point for this kind of source-follower circuit, especially as the number of imager pixels is increased.

Therefore, for a conventional source-follower driving the horizontal bus, the voltage drop across $M_{sel}$ precludes high speed operation with sufficient voltage swing and linearity.

Although ohmic drops are not problems for the opamp signal chain, its main problem is a rapid reduction in frame rate for a fixed bias current, as $W_{sel}$ size is increased. Since no dc current flows through $M_{sel}$ (shown as switches 128 in FIG. 2), the output voltage swing and the transfer gain remains unaffected by $M_{sel}$ size. Therefore, the opamp signal chain can be designed with small $W_{sel}$ to minimize the bus capacitance, and increase frame rate, without affecting the output voltage swing or transfer gain.

However, an opamp signal chain has its limitations as well. First, the opamp signal chain suffers from a larger increase due to the Miller Effect from the horizontal bus capacitance. This effect appears as a capacitance multiplier (see Equation 7). Therefore, for the value of $W_{sel}$, the effective bus capacitance seen by the opamp is larger than that seen by a source-follower circuit.

Secondly, an opamp based signal chain may provide increased pixel fixed pattern noise, if the capacitors on the two sides of the opamp (shown in FIG. 5) are not accurately matched. Thirdly, compared with that in a source follower circuit, noise in the opamp signal chain also increases as a result of the Miller Effect.

Thus, the problems can be summarized as follows.

1. For a source-follower signal chain, the ohmic drop in $M_{sel}$ causes unacceptably small voltage swing, large non-linearity, and reduced small signal gain at a given bias current as the frame-rate is increased, especially for large format arrays.

2. For an opamp signal chain, the output noise rises rapidly while frame rate drops rapidly (at a fixed bias current) with increasing the array format due to a rapid increase in the effective horizontal bus capacitance caused by the Miller effect.

SUMMARY

A switched source-follower design that does not require direct current current flow through the selection switch $M_{sel}$ solves the above-mentioned problems. It overcomes the limitations of existing opamp based or source-follower based circuits used in column multiplexers and data readout. The new signal chain circuit may be used to improve the performance of CMOS imagers or readout integrated circuits (ROIC) for infrared (IR) or ultraviolet (UV) detectors.

In an aspect of the circuits and methods disclosed herein, an analog bus driver and multiplexer circuit for a detector comprising an array of pixels is provided, the pixels being read out by columns, the circuit comprising a switched source-follower in each column connected by a bus common to the columns.

In another aspect of the circuits and methods disclosed herein, a detector of radiation is provided, comprising: an array of pixels, wherein the pixels are read out by columns; and at least one analog bus driver and multiplexer circuit for readout, the circuit comprising: a switched source-follower in each column connected to a bus common to the columns.

In yet another aspect of the circuits and methods disclosed herein, a method is provided for readout of a detector comprising a focal plane array of pixels, wherein the pixels are read out by columns, comprising the steps of: providing a switched source-follower in each column followed by a switched-capacitor gain stage common to the columns; sequentially reading out each column by switching the source-follower in each column to connect the source-follower output to a bus common to the columns; passing the source-follower output through the bus to the switched-capacitor gain stage.

In still another aspect of the circuits and methods disclosed herein, an analog bus driver and multiplexer circuit for an imager is provided, the circuit comprising: a plurality of columns, each column comprising a switched source-follower; and a switched capacitor gain stage common to the plurality of columns, each source follower being connected to the switched capacitor gain stage.

BRIEF DESCRIPTION OF DRAWINGS

The present invention will be understood and appreciated more fully from the following detailed description taken in conjunction with the drawings. The drawings are described below.

DETAILED DESCRIPTION OF PREFERRED EMBODIMENTS

In accordance with the present disclosure, an analog bus driver and multiplexer comprising a switched source-follower circuit architecture is provided.

Figure 1:
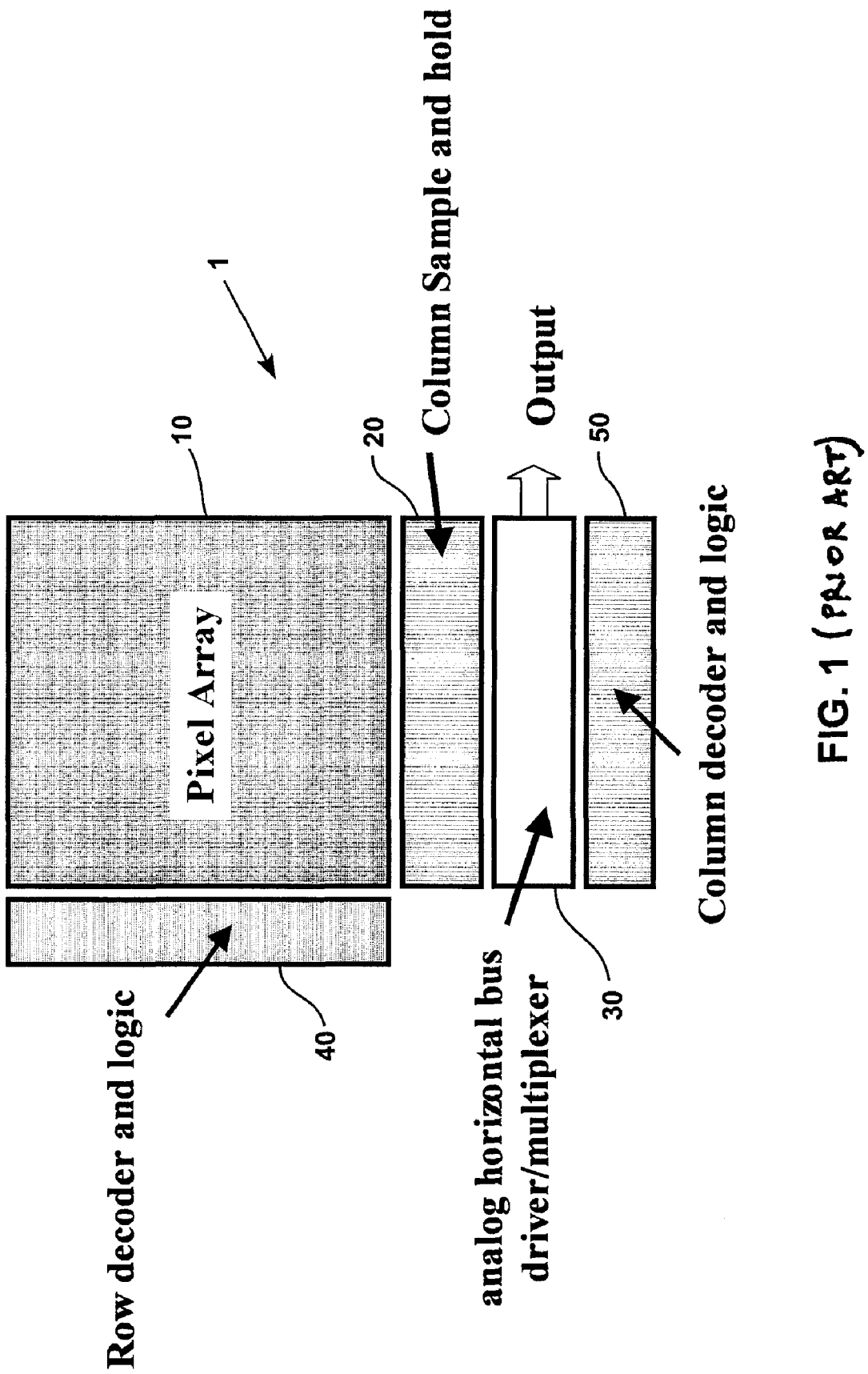
FIG. 1 is a schematic block diagram of an integrated visible CMOS imager or readout integrated circuit (ROIC) 1 for infrared (IR) or ultraviolet (UV) detectors.
Figure 2:
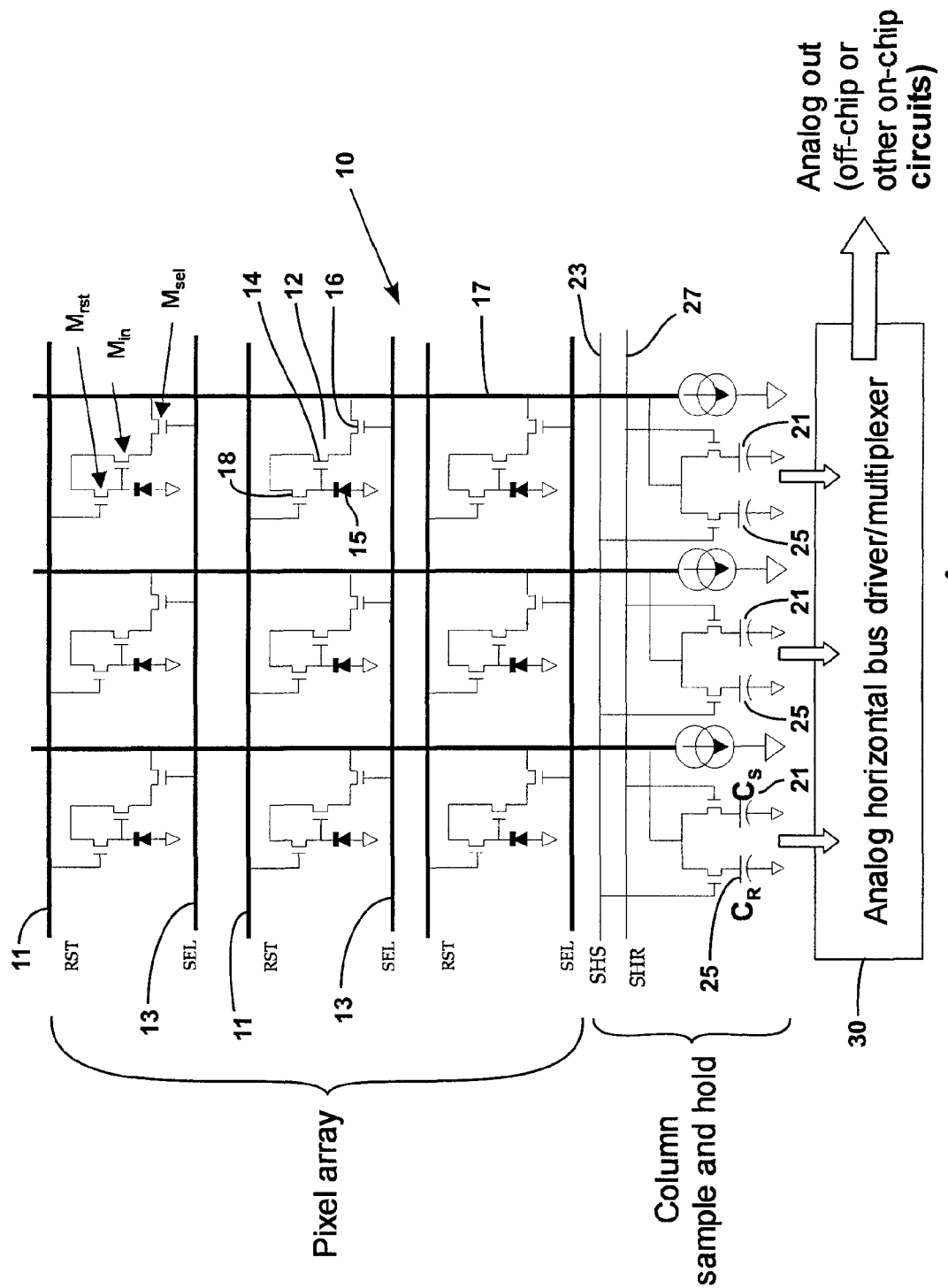
FIG. 2 is a schematic for the CMOS imager/ROIC architecture with a source-follower per detector architecture.
Figure 3:
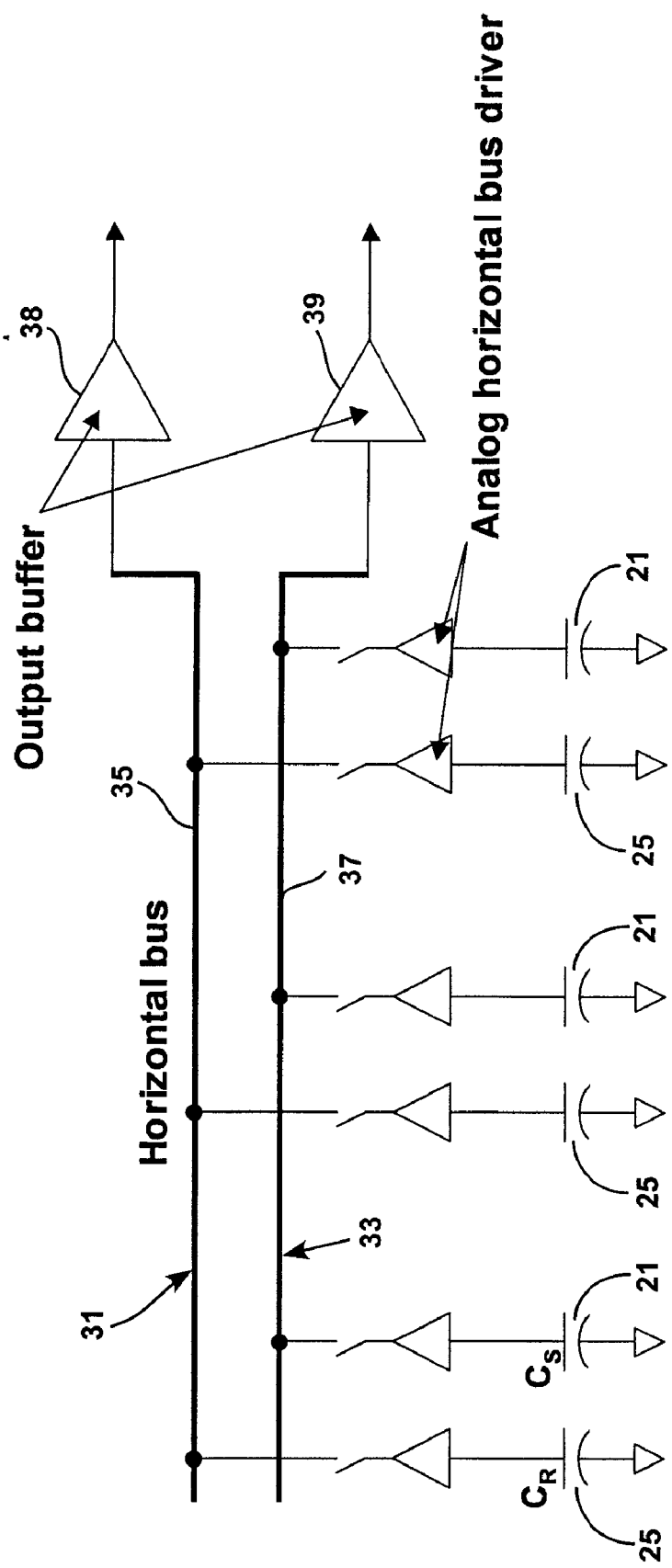
FIG. 3 is a schematic of two analog bus driver/multiplexer circuits.
Figure 4:
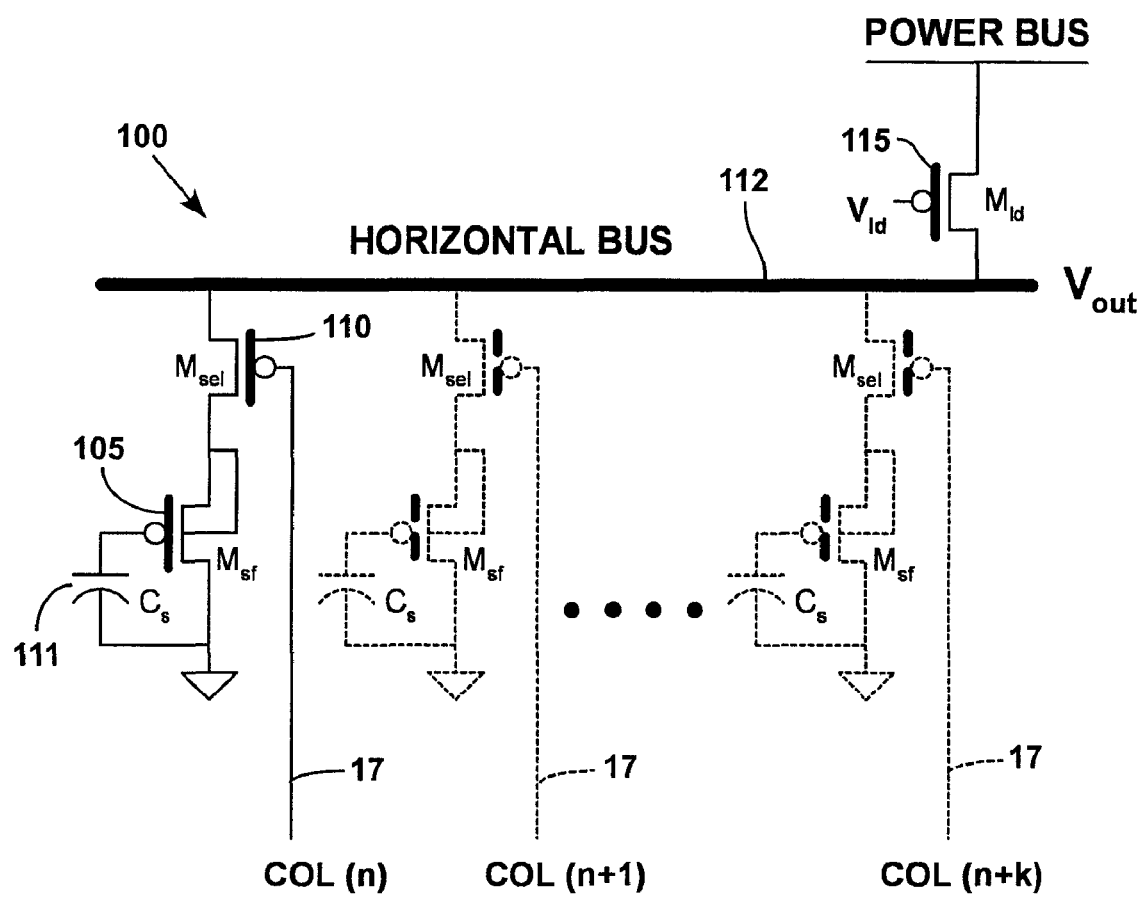
FIG. 4 is a schematic of a column source follower signal chain architecture.
Figure 5:
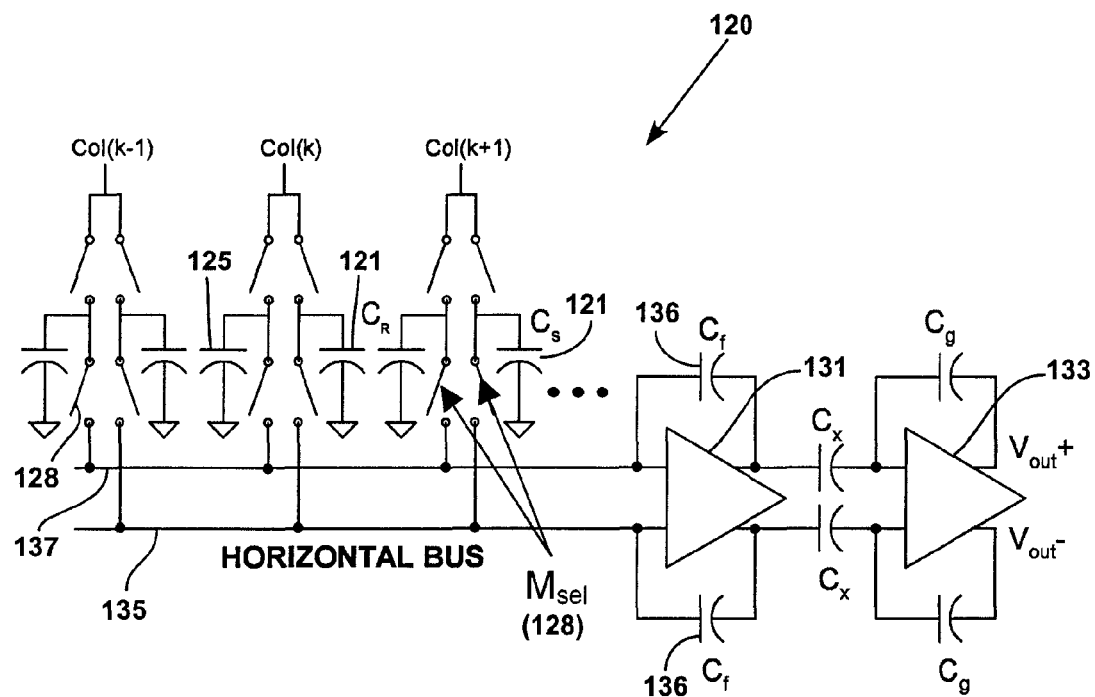
FIG. 5 is a schematic of an opamp signal chain architecture.
Figure 6:
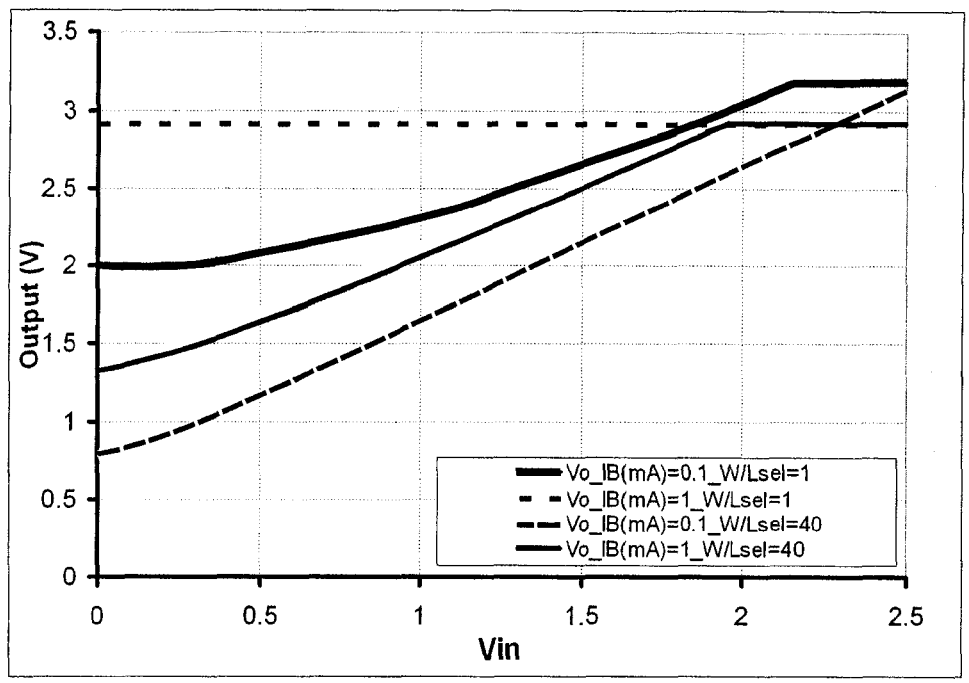
FIG. 6 is a graph that shows the dependence of a p-channel source-follower output voltage (solid lines) on bias current $IB_s$ (dotted lines) on $M_{sel}$ width.
Figure 7:
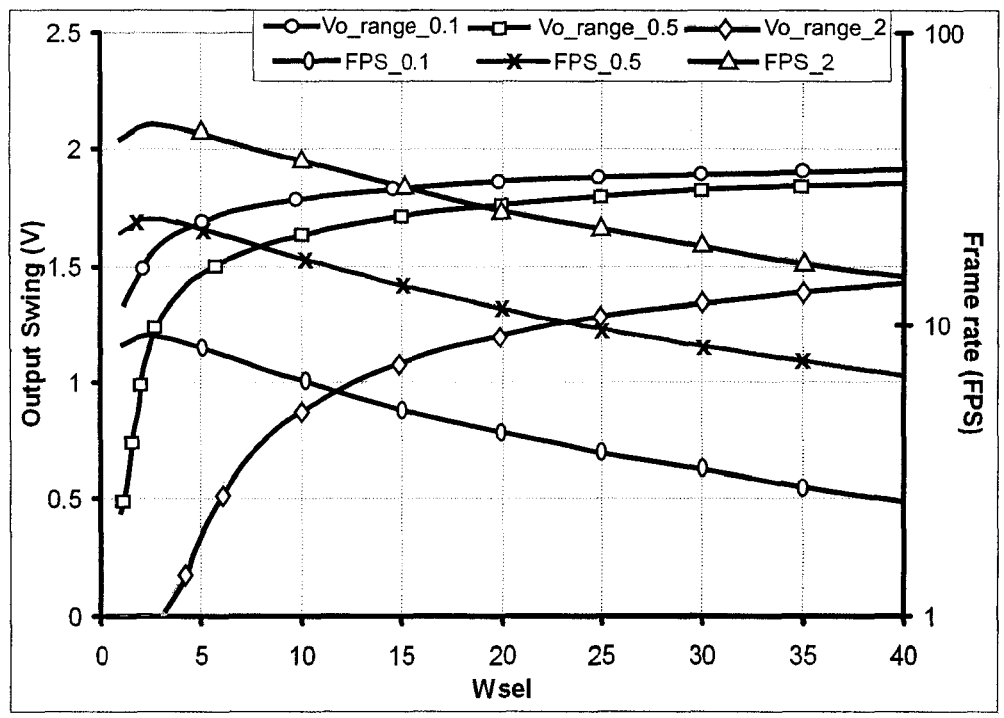
FIG. 7 is a graph that shows the dependence of frame rate and output voltage for a source-follower signal chain as a function of Msel (for minimum length of Msel) for three different bias currents 0.1, 0.5, and 2 mA.
Figure 8:
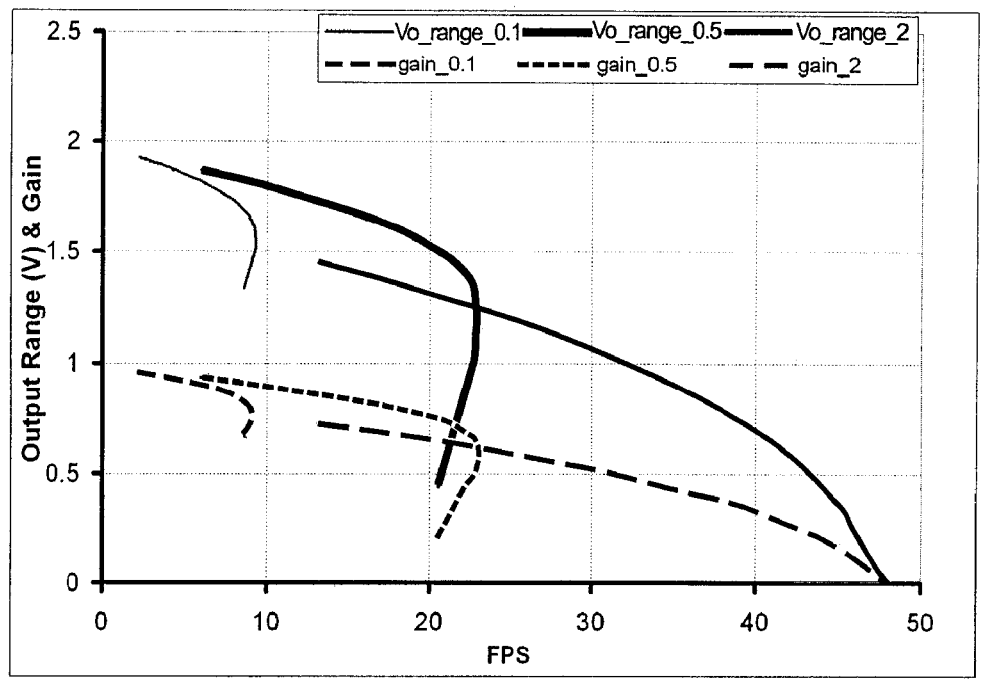
FIG. 8 is a graph that shows the dependence of output voltage and gain on frame rate for a conventional surce-follower driving a horizontal bus in which the bias currents are 0.1, 0.5, and 2 mA, respectively.
Figure 9:
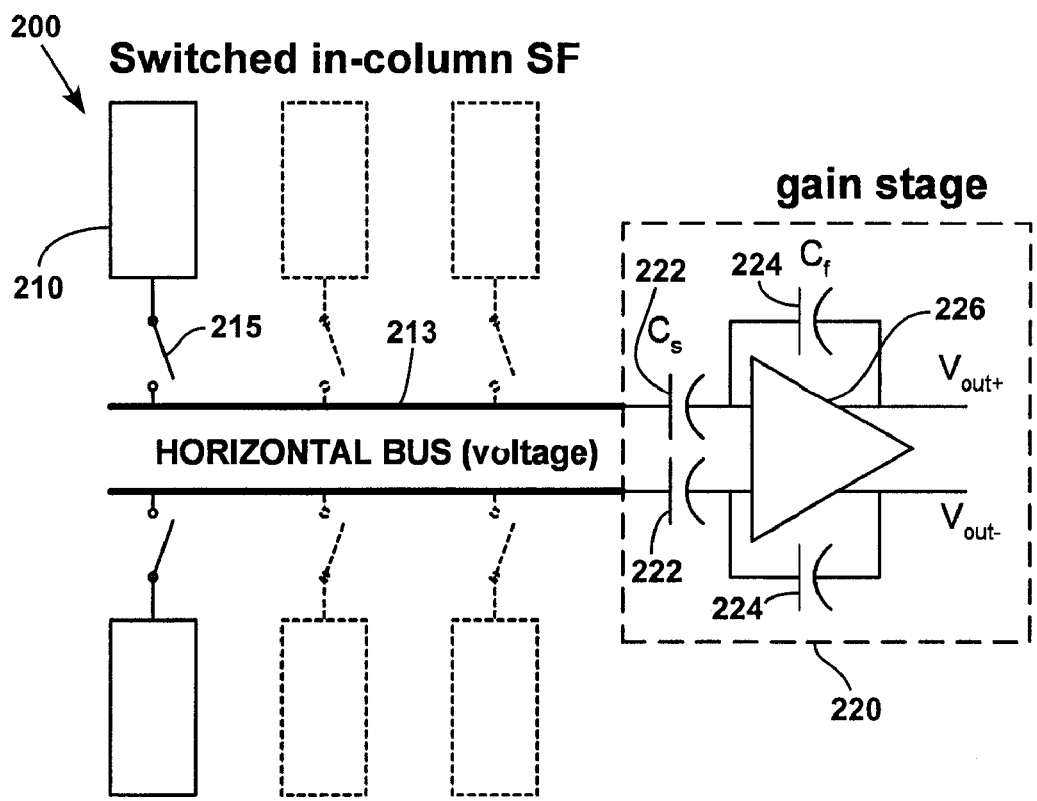
FIG. 9 is a schematic of the architecture of a new column signal chain according to a preferred embodiment, namely a source-follower with access-switch based signal chain.

FIG. 9 shows the architecture of a switched source-follower bus driver 200 with access switches 215 for multiplexing to the horizontal bus 213. It consists of a new switched source-follower 210 in each column (called an in-column switched source to follower ("ICS2F")) followed by a single switched capacitor gain stage 220. The switched capacitor gain stages consists of gain setting capacitors 222 ($C_s$) and 224 ($C_f$) and a high gain operational amplifier 226. This architecture overcomes the problems associated with the two signal chains (conventional source follower circuit and opamp signal chain circuit) described earlier.

First, in this implementation, no dc current flows through the selection switch 215 ($M_{sel}$), and therefore this circuit does not suffer from ohmic drop issues that affect conventional source-follower based signal chains. By eliminating the ohmic drop in the multiplexing access switch 215, the output voltage swing is increased, non-linearity is eliminated, and the small signal gain will approach its ideal value—unity (see FIG. 13).

Secondly, since no dc current flows through the selection switch 215 ($M_{sel}$), its width can be reduced, minimizing the horizontal bus capacitance, and speeding up the circuit speed even with small bias currents.

Thirdly, there is only one switched capacitor gain stage 220 situated at the end of the horizontal bus. The input to the switched capacitor gain stage 220 is a capacitor 222 and the virtual ground of the operational amplifier within the gain stage is not connected to the horizontal bus 213. The horizontal bus 213 carries voltage as opposed to charge (as was the case with the conventional opamp signal chain discussed earlier). Hence the bus charging and discharging is not slowed down by the Miller effect, allowing high speed horizontal bus driver circuit (source follower in this case) operation even with small bias currents.

Figure 10:
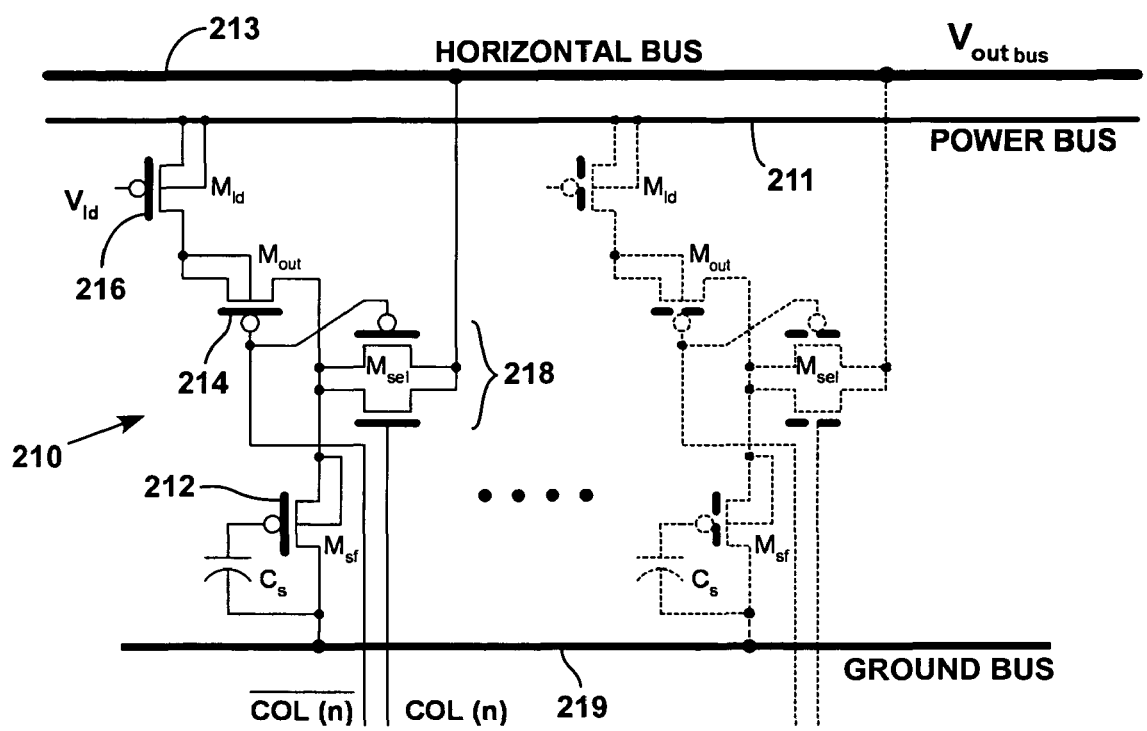
FIG. 10 is a schematic circuit diagram of the source-follower horizontal bus driver circuit of the preferred embodiment according to FIG. 9.

FIG. 10 shows a preferred version of the schematic circuit diagram of the source-follower horizontal bus driver circuit. It consists of a switched source-follower 210 in each column formed by FETs 212 ($M_{sf}$), 214 ($M_{out}$), and 216 ($M_{ld}$). Unlike a conventional source-follower chain, the load FET 216 ($M_{ld}$) is in each column, and is selected by turning on the FET 214 ($M_{out}$). Since the load FET 216 is in every column, a power bus 211 runs across each column connecting to the sources of load FETs 216 in every column. The source of the FET 212 ($M_{sf}$) constitutes the output of the source-follower. Each column output is connected to the horizontal bus 213 through the composite access FET 218 ($M_{sel}$). Since the FETs 214 ($M_{out}$) and 218 ($M_{sel}$) are turned off when a column is not selected, the current draw is similar to that of a conventional source-follower signal chain, while the elimination of ohmic drop across the composite access FET 218 ($M_{sel}$) allows the width of the composite access FET ($M_{sel}$) to be reduced to a minimum, causing a significant reduction in the bus capacitance.

Figure 11:
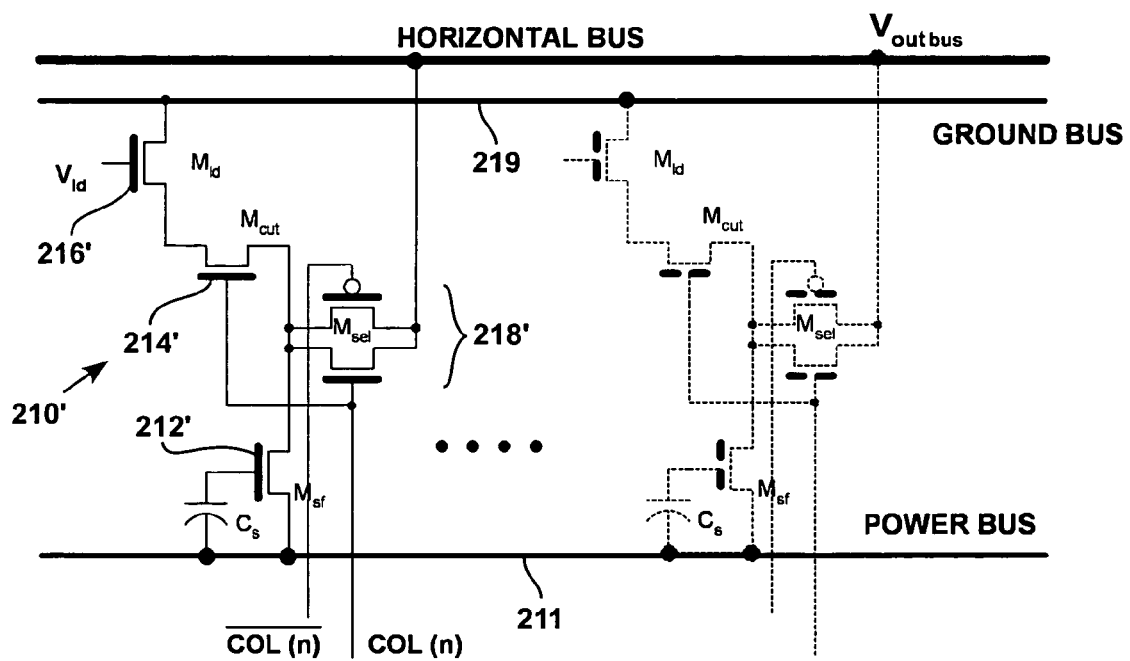
FIG. 11 is a schematic circuit diagram of the source-follower horizontal bus driver circuit of the preferred embodiment according to FIG. 9, in which the polarity of the transistors is reversed.

FIG. 11 shows a reversed polarity version 210' of the switched source-follower circuit shown in FIG. 10, in which each transistor is of opposite polarity to that shown in FIG. 10. Accordingly, the load FET 216' is connected to the ground bus 219 and the source-follower FET 212' connects to the power bus 211.

Figure 12:
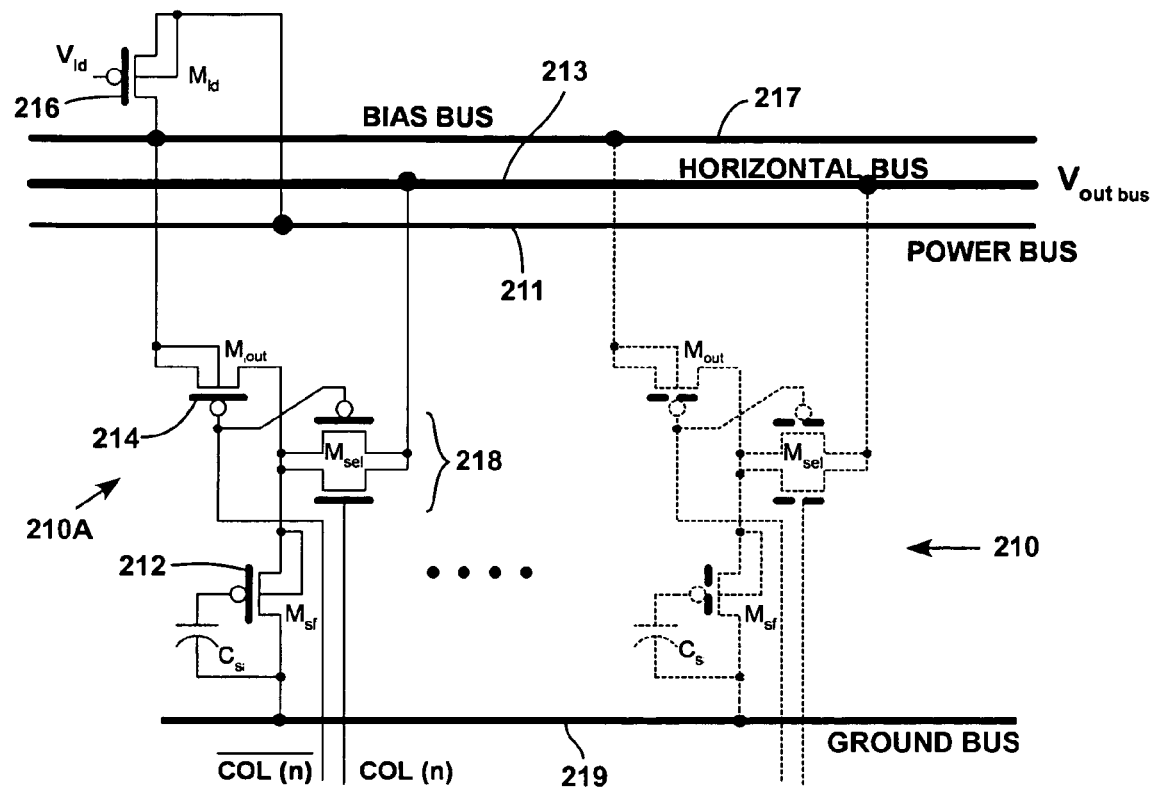
FIG. 12 is a schematic circuit diagram of an alternative version of the source-follower horizontal bus driver circuit of the preferred embodiment according to FIG. 9.

In an alternate arrangement, it is also possible to eliminate the power bus from running across all columns by moving the load FET out of the column and using a bias bus 217, as shown in the switched source-follower 210A shown in FIG. 12. In this case, the bus capacitance remains small like that in the circuit of FIG. 10, but the voltage drop across the FET 214 ($M_{out}$) causes a reduction in voltage swing. The transistors in this circuit may have reversed polarity as explained in connection with FIG. 11.

The output of the source-follower circuit 210 is given by:

$$V_{out} = V_{Cs} + V_{to} + \sqrt{\frac{2I_{bias}}{\beta_{sf}}} \quad [9]$$

The response time is determined by the time required to charge the horizontal bus parasitic ($C_B$) and load capacitance ($C_{drvsf}$) [equal to $C_s$ in FIG. 9], and depends on the bias current ($I_{bias}$) and the transconductance of the composite access FET 218 $M_{sf}$. By adding the slewing and the settling time together (assuming single pole response), the dependence $I_{bias}$ on the column readout time ($\Delta t_{read}$) is given by:

$$I_{bias} = I_R + \frac{I_S}{2}\left[1 + \sqrt{1 + 4\frac{I_R}{I_S}}\right] \quad [10]$$

$$I_R = \frac{(C_{drvsf} + C_B) \cdot \Delta V}{\zeta \cdot \Delta t_{read}}; \quad I_S = \frac{(C_{drvsf} + C_B)^2 \cdot \chi}{2\beta_{sf} \cdot \Delta t_{read}^2};$$

$$C_B = N_{col} \cdot (W_{sel} \cdot C_{edge} + C_{par})$$

In the circuit shown in FIG. 10, the noise contribution from the composite access FET 218 ($M_{sel}$) is minimized as a result of elimination of dc current flow through it. Sampled noise in this circuit is determined by the load capacitance and transconductance of the input FET $M_{sf}$. With the same sized input FET, noise in this circuit is smaller than that in the opamp signal chain by a factor $F_{op}$, where $$F_{op} = \sqrt{\frac{C_L + C_B}{\left[C_L + \frac{C_f \cdot (C_B + C_s)}{C_f + C_B + C_s}\right] \cdot \left[\frac{C_f + C_B + C_s}{C_f}\right]}} \quad [11]$$

The reduction in noise in the source follower signal chain is due to the absence of the Miller effect that increases opamp signal chain noise. Therefore, unlike that of opamp based signal chain, the Miller multiplier term is absent from both the bias current and noise, allowing the source-follower based signal chain to simultaneously run faster and have lower noise.

Figure 13:
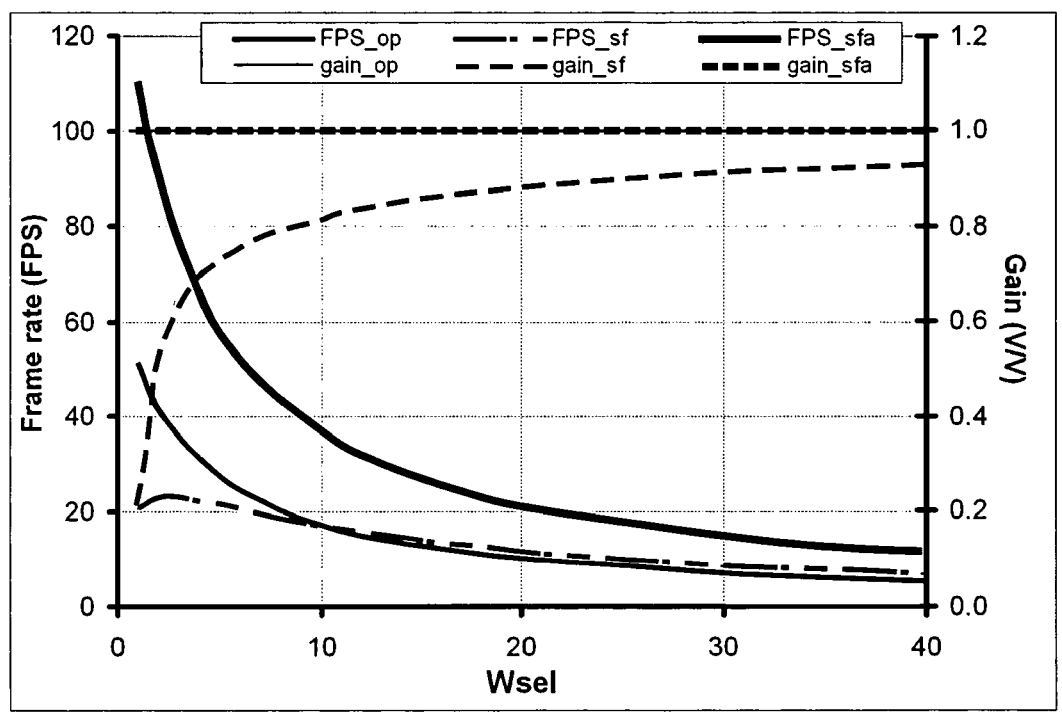
FIG. 13 is a graph that shows the dependence of the frame rate (FPS) and the signal chain gain (gain) for three different circuits: the conventional source-follower (sf), the conventional opamp (op), and the in-column switched source follower (sfa) according to the present disclosure, for a megapixel imager.

FIG. 13 shows the simulated dependence of frame rate and signal chain gain on the size or width ("$W_{sel}$") of the select FET that connects. It indicates that of the three circuits, the switched source-follower circuit architecture (ICS2F) circuit ("sfa") can operate with the highest frame rate (frames per second or "FPS") for small $W_{sel}$, compared to the conventional source follower signal chain ("sf"), while providing unity gain at different $W_{sel}$, as in the case of the conventional op amp signal chain circuit ("op"). As expected, the frame rate for the ICS2F circuit reduces as $W_{sel}$ is increased. With increasing $W_{sel}$, the gain of a conventional source follower signal chain ("sf") increases (approaches unity), but at the cost of vastly reduced frame rates.

In conclusion, the switched source-follower circuit architecture (ICS2F) circuit provides several advantages compared with the other two circuits.

Compared with a conventional source follower circuit, the switched source-follower circuit architecture (ICS2F) circuit provides higher operating speed, higher gain, improved linearity, and lower noise.

Similarly, compared with a opamp signal chain, the switched source-follower circuit architecture (ICS2F) circuit provides higher operating speed and lower noise.

While illustrative embodiments of the circuits and methods disclosed herein have been shown and described in the above description, numerous variations and alternative embodiments will occur to those skilled in the art and it should be understood that, within the scope of the appended claims, the invention may be practised otherwise than as specifically described. Such variations and alternative embodiments are contemplated, and can be made, without departing from the scope of the invention as defined in the appended claims.

What is claimed is:

1. An analog bus driver and multiplexer circuit comprising:
   an array of pixels, the pixels being read out by columns, each column comprising a source follower connected to a first bus common to the columns through a selection switch, and
   a load switch such that a biasing current generated through a second bus flows through the load switch and the source follower without flowing through the selection switch when a column is selected.

2. The analog bus driver and multiplexer circuit according to claim 1, wherein the load switch is a plurality of dedicated load switches, each dedicated load switch placed in a respective column.

3. The analog bus driver and multiplexer circuit according to claim 2, wherein the biasing current establishes a current path between the dedicated load switch and the source follower of a column when the column is selected, the current path being separate from a voltage output path of the selection switch.

4. The analog bus driver and multiplexer circuit according to claim 3, wherein the selection switch is connected between the load switch and the source follower.

5. The analog bus driver and multiplexer circuit according to claim 4, wherein the source follower, the selection switch and the load switch are field effect transistors (FET).

6. The analog bus driver and multiplexer circuit according to claim 5, wherein the selection switch is a composite access FET comprising an n-type FET and a p-type FET, the n-type FET being connected in parallel with the p-type FET.

7. The analog bus driver and multiplexer circuit according to claim 2, further comprising a transistor between the load switch and the source follower in a current path between the load switch and the source follower.

8. The analog bus driver and multiplexer circuit according to claim 2, wherein the second bus is a power bus.

9. The analog bus driver and multiplexer circuit according to claim 8, wherein the power bus is connected to the load switch.

10. The analog bus driver and multiplexer circuit according to claim 8, wherein the power bus is connected to the source follower.

11. The analog bus driver and multiplexer circuit according to claim 1, wherein the load switch is a common load switch common to the columns.

12. The analog bus driver and multiplexer circuit according to claim 11, wherein a current path between the common load switch and the source follower of a column when the column is selected is separate from a voltage output path of the selection switch.

13. The analog bus driver and multiplexer circuit according to claim 12, wherein the common load switch is operated through a third bus.

14. The analog bus driver and multiplexer circuit according to claim 12, wherein the selection switch is connected between the load switch and the source follower but outside the current path between the load switch and the source follower.

15. The analog bus driver and multiplexer circuit according to claim 14, wherein the source follower, the selection switch and the load switch are field effect transistors (FET).

16. The analog bus driver and multiplexer circuit according to claim 15, wherein the selection switch is a composite FET.

17. The analog bus driver and multiplexer circuit according to claim 11, further comprising a transistor between the load switch and the source follower in a current path between the load switch and the source follower.

18. The analog bus driver and multiplexer circuit according to claim 11, wherein the second bus is a power bus.

19. The analog bus driver and multiplexer circuit according to claim 18, wherein the power bus is connected to the common load switch.

20. The analog bus driver and multiplexer circuit according to claim 1, wherein the array of pixels is on a focal plane.

21. A detector of radiation comprising the analog bus driver and multiplexer circuit according to claim 1.

22. The detector of radiation of claim 21, wherein the array of pixels of the analog bus driver and multiplexer circuit is on a focal plane.

23. The detector of radiation of claim 22, further comprising a one-dimensional array of column sample and hold circuits, row decoder and logic circuit arrays, and column decoder and logic circuit arrays to access the pixels in the array of pixels for reading.

24. The detector of radiation of claim 21, wherein the source follower in each column of the analog bus driver and multiplexer circuit is connected to an operational amplifier.

25. The detector of radiation of claim 21, further comprising a Miller effect reducing capacitor and an operational amplifier having an operational amplifier input. wherein the source follower is connected to the first bus, and the Miller effect reducing capacitor is connected in series with the first bus and is connected to the operational amplifier input.

26. The detector of radiation of claim 25, wherein the Miller effect reducing capacitor is connected in series with the first bus on one end and is connected to the operational amplifier input on another end.

27. The detector ot radiation of claim 25, wherein the Miller effect reducing capacitor is connected with the selection switch in each column of the array of pixels.

28. The analog bus driver and multiplexer circuit of claim 1 further comprising:
  a switched capacitor gain stage common to the columns, each source follower being connected to the switched capacitor gain stage.
  wherein the switched capacitor gain stage comprises an operational amplifier and wherein the source follower is connected through the operational amplifier to the first bus. the first bus being a voltage-carrying bus capacitively coupled to the operational amplifier.

* * * * *